United States Patent
Bouillon et al.

(10) Patent No.: US 7,200,912 B2
(45) Date of Patent: Apr. 10, 2007

(54) MAKING COMPOSITE MATERIAL PARTS FROM BLANKS MADE BY REINFORCING A FIBER STRUCTURE AND/OR BONDING FIBER STRUCTURES TOGETHER

(75) Inventors: Eric Bouillon, Talence (FR); Dominique Coupe, Le Haillan (FR); Rémi Bouvier, Merignac (FR); Eric Philippe, Merignac (FR)

(73) Assignee: Snecma Propulsion Solide, Le Hallan (FR)

(*) Notice: Subject to any disclaimer, the term of this patent is extended or adjusted under 35 U.S.C. 154(b) by 191 days.

(21) Appl. No.: 10/786,507

(22) Filed: Feb. 25, 2004

(65) Prior Publication Data
US 2004/0175553 A1 Sep. 9, 2004

(30) Foreign Application Priority Data
Mar. 4, 2003 (FR) .................................. 03 02614

(51) Int. Cl.
*B23B 7/08* (2006.01)

(52) U.S. Cl. ............................ 29/432; 428/223; 156/92

(58) Field of Classification Search ................. 29/432, 29/525.07; 428/223, 119, 304.4; 156/92, 156/91, 84, 160, 580.1
See application file for complete search history.

(56) References Cited

U.S. PATENT DOCUMENTS

| 4,515,847 | A | | 5/1985 | Thompson et al. |
| 4,808,461 | A | * | 2/1989 | Boyce et al. ............... 428/119 |
| 5,454,990 | A | | 10/1995 | Chareire et al. |
| 5,827,383 | A | | 10/1998 | Campbell et al. |
| 6,177,146 | B1 | | 1/2001 | Fisher et al. |
| 6,268,049 | B1 | * | 7/2001 | Childress ................. 428/309.9 |

FOREIGN PATENT DOCUMENTS

| GB | 1087984 A | 10/1967 |
| WO | WO 97/06948 | 2/1997 |

* cited by examiner

Primary Examiner—David P. Bryant
Assistant Examiner—Christopher M. Koehler
(74) Attorney, Agent, or Firm—Weingarten, Schurgin, Gagnebin & Lebovici LLP

(57) ABSTRACT

A porous fiber structure is consolidated by forming within a deposit of a refractory material by partially densifying the fiber structure in such a manner as to bond together the fibers of the fiber structure so as to enable the fiber structure to be handled without being deformed, while leaving empty the major fraction of the initial pore volume of the fiber structure, and rigid pins are implanted through the consolidated porous structure. A blank is obtained by reinforcing a fiber structure by implanting pins or by bonding together consolidated fiber structures, the bonding being performed by implanting pins. A composite material part is obtained by densifying the blank.

13 Claims, 1 Drawing Sheet

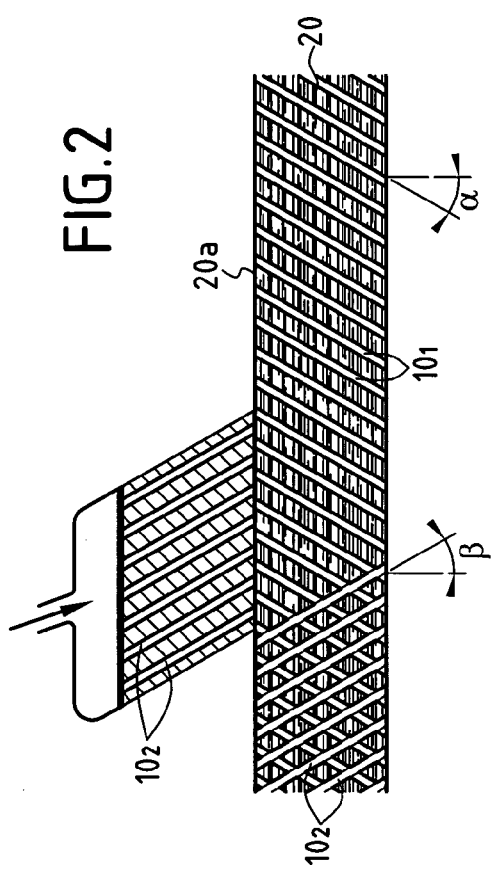
FIG.1
FIG.2
FIG.4
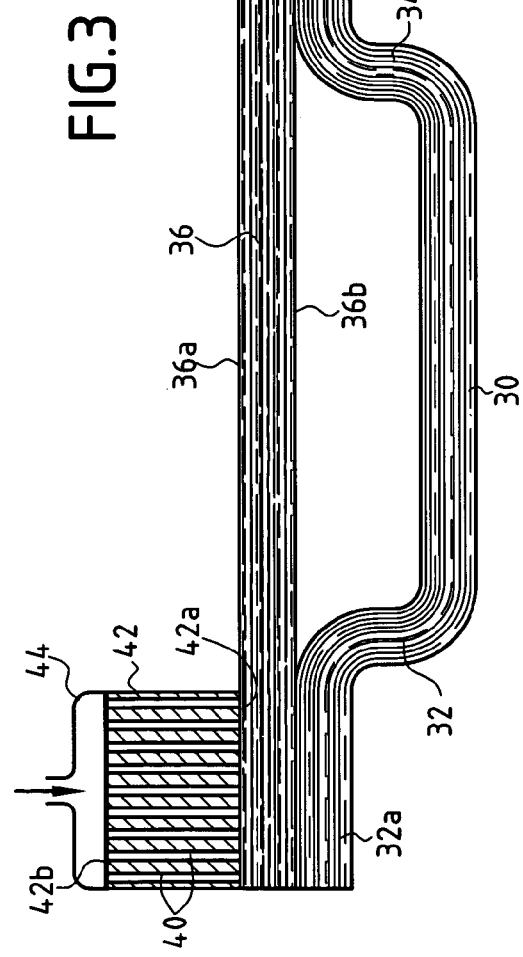
FIG.3

MAKING COMPOSITE MATERIAL PARTS FROM BLANKS MADE BY REINFORCING A FIBER STRUCTURE AND/OR BONDING FIBER STRUCTURES TOGETHER

Making a blank by reinforcing a fiber structure and/or bonding fiber structures together, and use in making composite material parts.

This application claims priority to a French patent application No. 03 02614 filed Mar. 4, 2003.

BACKGROUND OF THE INVENTION

The present invention relates to making composite material parts from fiber blanks made from one or more porous fibrous structures, in particular thermostructural composite material parts.

Thermostructural composite materials are remarkable for their good mechanical properties and for their ability to conserve these properties at high temperatures. They are used in particular for making structural parts in the fields of aviation and space. Typical examples of thermostructural materials are carbon/carbon (C/C) composite materials comprising carbon fiber reinforcement densified by a carbon matrix, and ceramic matrix composite (CMC) materials. CMC materials comprise fiber reinforcement made of refractory fibers (generally carbon or ceramic) and densified by a ceramic matrix or a combined carbon and ceramic matrix. An interphase layer, e.g. of pyrolytic carbon (PyC) or of boron nitride (BN) can be interposed between the reinforcing fibers and the ceramic matrix in order to improve the mechanical behavior of the material.

The manufacture of a CMC or C/C composite material part generally comprises preparing a fiber preform that is to constitute the reinforcement of the composite material, and then densifying the preform with a matrix of ceramic or carbon, possibly after forming an interphase layer on the fibers of the preform.

The preform is made from one- or two-directional fiber fabrics such as yarns, tows, ribbons, woven cloth, unidirectional sheets, layers of felt. The preform is shaped, by steps of winding, weaving, braiding, knitting, or draping plies.

Densification may be performed by a liquid method, i.e. by impregnating the preform with a liquid composition containing a precursor of the ceramic or carbon material of the matrix. The precursor is typically a resin, which, after being cured, is subjected to heat treatment for ceramization or carbonization.

Densification can also be performed using a gas method, i.e. by chemical vapor infiltration using a reaction gas containing one or more precursors of the ceramic or carbon matrix. The gas diffuses within the pores of the fiber preform, and under particular conditions of temperature and pressure it forms a deposit of carbon or ceramic on the fibers, either by means of a component of the gas decomposing or else by means of a reaction taking place between a plurality of components.

The above processes of preparing CMC or C/C composite material parts are themselves well known.

The mechanical properties of a fiber-reinforced composite material part depend, in particular, on the ability of the fiber reinforcement to withstand various kinds of stress.

Thus, when the fiber reinforcement is constituted by a preform built up as a stack of two-dimensional plies, it can be necessary to provide good bonding between the plies. This ability of the reinforcement to withstand stresses in a direction extending transversely relative to the plies (or Z direction) can be obtained in well-known manner by needling together the superposed plies. Nevertheless, needling can be insufficient or difficult to perform. In particular, when using ceramic fibers, for example, needling can have a destructive effect on the fibers, thereby weakening the reinforcement in the plane of the plies.

Multilayer fiber structures are also known in which the bonds between layers are provided by weaving or braiding. Nevertheless, good mechanical strength in the Z direction requires a high concentration of bonds between layers, which leads to a fiber structure that is rigid, and relatively unsuitable for being shaped, even when shaping requires deformation of limited amplitude only.

This drawback is also to be found with fiber structures that are built up from plies that are bonded together by stitching. In addition, for ceramic fiber structures, it is difficult to use a ceramic thread for stitching plies together.

Furthermore, when the parts that are to be manufactured are complex in shape, it can be difficult or even impossible to make a one-piece preform having a shape close to that of the part that is to be manufactured. One known solution then consists in making the preform by assembling a plurality of fiber structures of simpler shape. Effective bonding between the fiber structures must then be achieved in order to ensure that the composite material part does not deteriorate in operation by loss of cohesion in the reinforcing fiber preform.

Document WO 97/06948 describes a method consisting in implanting rigid pins through a structure formed by superposed fiber plies that have been preimpregnated by a resin, or through a plurality of structures for assembling together, each being built up from resin-preimpregnated fiber plies. The pins are initially inserted in a block of compressible material such as an elastomer. The block of compressible material with the pins is brought against a surface of the structure made up of preimpregnated plies. Ultrasound energy is applied to the pins while simultaneously compressing the block in which they are inserted so that the pins are transferred into the structure built up from preimpregnated plies, thereby reinforcing such a structure or bonding it to an underlying structure. A resin matrix composite material part is then obtained by curing the resin.

Such a method is restricted to manufacturing composite materials having an organic matrix. Although document WO 97/06948 does indeed state that pins can be inserted after the resin has been cured, it will nevertheless readily be understood that the method can then only be applied to structures that are thin, unless the pins used are made of a material that is very rigid and strong, in particular metal pins and/or pins of relatively large diameter. Unfortunately, for thermostructural composite material parts that are to be exposed in operation to temperatures that are very high, the use of metal pins is undesirable, either because of the reduced strength of metal at such temperatures, or else because of differential expansion between the metal and the ceramic or carbon components of the composite material. In addition, the use of large-diameter pins can be undesirable because of the non-uniformity they impart to the structure of the composite material.

It is also stated in document WO 97/06948 that the pins can be inserted in dry fiber plies, i.e. plies that have not been preimpregnated. However, with a set of fiber plies or with a plurality of sets of plies that have been joined together, that cannot suffice to confer sufficient strength to enable them to be handled without being deformed. It is then necessary to use tooling in order to conserve the desired shape prior to densifying the fiber plies, which can be expensive and difficult to achieve, particularly when the composite material parts to be made are complex in shape.

OBJECT AND SUMMARY OF THE INVENTION

An object of the invention is to propose a method enabling a fiber structure to be reinforced or a plurality of fiber structures to be bonded together while avoiding the above-mentioned drawbacks.

In one aspect, the invention provides a method of making a fiber-reinforced composite material part, which method comprises:

providing at least one porous fiber structure; consolidating the porous fiber structure by forming within it a deposit of a refractory material by partially densifying the fiber structure so as to bond together the fibers of the fiber structure by the deposit to enable the fiber structure to be handled without being deformed, the pore volume of the porous fiber structure being reduced by no more than 40% of the initial value by the partial densification so as to leave empty the major fraction of the initial pore volume of the fiber structure; subsequently implanting rigid pins through the consolidated fibrous porous structure, whereby a reinforced consolidated fiber blank is obtained; and obtaining the composite material part by further densifying the fiber blank.

In another aspect, the invention provides a method of making a fiber-reinforced composite material part, which method comprises:

providing a plurality of porous fiber structures; consolidating each porous fiber structure by forming within it a deposit of a refractory material by partially densifying the fiber structure so as to bond together the fibers of the fiber structure by the deposit to enable the fiber structure to be handled without being deformed, the pore volume of the porous fiber structure being reduced by no more than 40% of the initial value by the partial densification so as to leave empty the major fraction of the initial pore volume of the fiber structure; putting the consolidated porous fiber structures together; connecting the consolidated porous fiber structures together by implanting pins of rigid material through the adjoining consolidated porous fiber structures, whereby a fiber blank is obtained; and obtaining the composite material part by further densifying the fiber blank.

The invention is remarkable in that the pins are implanted at a stage when the fiber structure is consolidated;

This leads to several significant advantages compared with implantation being performed on dry fiber structures or structures that have been preimpregnated with a resin or that have already densified by a cured resin.

In a consolidated fiber structure, the fibers are bonded to one another so the pins can be implanted without deforming the fiber structure and without it being necessary to keep the fiber structure in tooling to avoid it being deformed.

In addition, the fiber structure can be consolidated after being shaped. The implantation density of the pins can then be high since the problem of the ability of the reinforced structure to deform no longer arises.

Particularly when making blanks of complex shape, the industrial process is simplified. Blanks can be made by assembling together fiber structures that are simple in shape and that can easily be consolidated separately and beforehand.

In addition, since a consolidated fiber structure is partially densified, the pins are better held in place after they have been implanted than is the case for a dry structure in which the fibers remain free.

Furthermore, since the remaining pore volume in a consolidated fiber structure is large, the presence of a deposit providing partial densification does not constitute an obstacle to pin penetration, even for a fiber structure of considerable thickness. It is therefore possible to use small-diameter pins made of a variety of rigid materials that are compatible with the intended use for the blank.

Advantageously, the or each fiber structure is consolidated by reducing its pore volume by a quantity lying in the range 8% to 40% of its initial value.

When the or each fiber structure used has a pore volume ratio lying in the range 50% to 70%, then consolidation is performed, for example, so as to reduce the pore volume ratio down to a value lying in the range 40% to 60%. The term "pore volume ratio" of a fiber structure is used herein to mean the fraction of the apparent volume of the fiber structure that is occupied by its pores.

The or each fiber structure is consolidated by forming a deposit of refractory material, typically ceramic and/or carbon, particularly when the blank is for use in making a thermostructural composite material part.

Consolidation can then be performed by chemical vapor infiltration. Consolidation by depositing ceramic may optionally be performed after forming an interphase layer on the fibers of the fiber structure so that said interphase layer lies between the fibers and the ceramic deposit.

In a variant, consolidation can be performed by impregnation with a liquid composition containing a ceramic or carbon precursor, and then transforming the ceramic or carbon precursor, which precursor may be a resin.

The pins used can be made by densifying and stiffening a yarn or a tow with a matrix, e.g. a ceramic or carbon yarn or tow densified and stiffened by means of an organic matrix.

It is also possible to use pins made in the form of rigid single filaments, e.g. single filaments having a carbon core carrying a ceramic coating that may be made by chemical vapor deposition, or in the form of sticks of thermostructural composite material such as CMC or C/C.

The pins can be implanted in at least two different directions.

BRIEF DESCRIPTION OF THE DRAWING

The invention will be better understood on reading the following description given by way of non-limiting indication and made with reference to the accompanying drawing, in which:

FIG. 1 is a very diagrammatic view showing the reinforcement of a fiber structure in a first implementation of the invention;

FIG. 2 is a very diagrammatic view showing a variant implementation of the FIG. 1 method;

FIG. 3 is a very diagrammatic view showing fiber structures being bonded together in a second implementation of the invention; and FIG. 4 is a photograph showing a consolidated fiber blank in which pins have been implanted in accordance with the invention.

DETAILED DESCRIPTION OF IMPLEMENTATIONS OF THE INVENTION

The invention can be applied to a variety of porous fiber structures.

It applies to three-dimensional fiber fabrics which can be constituted in particular by:

structures made at least in part by superposing two-dimensional fiber fabrics such as: plies of flat woven, knitted, or braided fabric; unidirectional sheets made up of mutually parallel filamentary elements; multidirectional sheets made up by stacking and bonding together (e.g. by needling) unidirectional sheets disposed in different directions; layers of felt which two-dimensional fabrics can be bonded to one another by needling or stitching, for example;

multilayer structures formed at least in part by three-dimensional weaving, knitting, or braiding of yarns or tows, the bonding between the layers of the structure being implemented by means of yarns or tows during the weaving, knitting, or braiding; and structures constituted at least in part by thick felts.

The fiber fabrics may be in the form of flat plates or they may be shaped, e.g. by superposing fiber plies on a support having a special shape corresponding to the shape desired for the fabric.

When fiber fabrics are to be used in making blanks for making thermostructural composite material parts, the fibers constituting said fabrics are typically ceramic or carbon fibers, or fibers made of a ceramic or carbon precursor, with transformation of the precursor being performed by heat treatment at a stage subsequent to that of making the fiber structure.

Regardless of whether the method of the invention is used for reinforcing a fiber structure or for bonding together a plurality of fiber structures, the or each porous fiber structure is initially consolidated.

Consolidation can be performed by deposing a refractory material within the fiber structure to bond together the fibers of the structure in such a manner that the fiber structure can easily be handled without being deformed, but while nevertheless leaving empty the major fraction of the initial pores in the fiber structure.

Consolidation thus consists in partial densification leading to a reduction in the initial pore fraction, said reduction preferably being by no more than 40% of the initial pore fraction, and typically being by 8% to 40%.

For a fiber structure having a pore volume ratio lying in the range 50% to 70%, consolidation typically leads to said ratio being reduced to a value lying in the range 40% to 60%. The consolidated fiber structure thus remains very porous.

Consolidation can be performed by chemical vapor infiltration. Under such circumstances, the fiber structure, optionally placed in tooling for holding it in a desired shape, is placed in an oven into which a reaction gas is introduced containing one or more precursors of the material that is deposited for consolidation purposes. Under particular determined conditions of pressure and temperature, the gas diffuses within the pores of the fiber structure to form therein the desired deposit of material either by a material precursor component of the gas decomposing, or by a reaction between a plurality of components.

Chemical vapor infiltration processes for depositing refractory material such as ceramic or carbon are well known.

Thus, for carbon, it is possible to use a gas comprising methane or propane, or a mixture thereof, at a pressure of less than 25 kilopascals (kPa) and at a temperature lying in the range 950° C. to 1100° C.

To deposit a ceramic such as silicon carbide (SiC), chemical vapor infiltration is performed, for example, at a temperature of about 900° C. to 1050° C. under a pressure of less than 25 kPa, using a reaction gas containing methyltrichlorosilane (MTS) which is a precursor of SiC, together with hydrogen gas ($H_2$). The hydrogen acts as a vector gas to encourage diffusion of the reaction gas within the fiber structure and form an SiC deposit therein by the MTS decomposing. A method of making an SiC matrix by chemical vapor infiltration is described in U.S. Pat. No. 5,738,908.

An interphase of pyrolytic carbon (PyC) or of boron nitride (BN) can be formed on the fibers of the fiber structure prior to depositing the consolidating SiC matrix phase. This interphase may be formed by chemical vapor infiltration, as described in U.S. Pat. No. 4,752,503.

Consolidation may also be performed by a liquid method.

To this end, the fiber structure, possibly while being held in tooling, is impregnated by a liquid composition containing a precursor of the material that is to be deposited.

The precursor is typically a resin. To perform consolidation by depositing carbon, an organic resin is used having a non-zero coke content, for example a phenolic resin. For implementing consolidation by depositing a ceramic, e.g. SiC, it is possible to use a resin of the polycarbosilane (PCS) type or of the polytitanocarbosilane (PTCS) type.

The resin may be put into solution in a suitable solvent, e.g. ethyl alcohol for a phenolic resin or xylene for PCS or PTCS.

After impregnation, the solvent is eliminated by drying, the resin is cured, and is then transformed into ceramic or carbon by heat treatment (ceramization or carbonization). Such methods of putting a ceramic or carbon deposit into place by a liquid technique are well known.

In order to limit the quantity of material deposited for consolidation purposes, impregnation is performed using a resin having a solid residue ratio after heat treatment that is not too great, and/or using a resin that is sufficiently diluted in a solvent. The major fraction of the initial pore volume in the fiber structure is restored, in part, once the resin has dried and cured, and additional pore volume is restored after ceramization or carbonization.

FIG. 1 is a diagram of a method of implanting pins in a consolidated fiber structure for the purpose of reinforcing the structure.

Implantation is advantageously performed by a process of the type described in document WO 97/06948. As shown in FIG. 1, pins 10 for implanting are initially inserted in a block 12 of compressible material, e.g. a foam or an elastomer. The pins extend between two opposite faces 12a and 12b of the block 12. One of the faces 12a of the block is brought into contact with a zone of the surface 20a of the consolidated fiber structure 20 that is to be reinforced. A transducer 14 connected to an ultrasound generator (not shown) is pressed against the other face 12b of the block 12 so as to transfer the pins through the consolidated fiber structure by applying ultrasound energy and compression to the block 12.

The process is repeated if necessary in order to reinforce the entire fiber structure 20, or part of the structure only, depending on reinforcement requirements.

The density of implantation is selected to be constant or otherwise depending on whether or not it is desirable for the fiber structure to be reinforced uniformly or otherwise.

In the example shown, the pins 10 are implanted in a direction normal to the surface 20a of the blank 20.

By way of example, the pins 10 are made of a composite material obtained by densifying a yarn or tow made up of ceramic or carbon fibers by means of an organic matrix or a carbon matrix, with the organic matrix being carbonized while temperature is being raised as is necessary for finishing off densification of the blank. By way of example, the organic matrix may be constituted by a resin of the bismaleimide (BMI) type.

Other materials may be used for the pins, in particular monofilaments constituted by a carbon fiber core stiffened by a ceramic coating, e.g. an SiC coating that is obtained by chemical vapor deposition. It is also possible to use CMC or C/C composite sticks, e.g. alumina/alumina composite sticks.

It should also be observed that the pins 10 may be implanted in a direction that is inclined at a non-zero angle relative to the normal to the surface 20a of the consolidated fiber structure 20, in any desired reinforcement direction.

It should also be observed that the pins may be implanted in a plurality of different directions. Thus, FIG. 2 shows a fiber structure 20 in which pins $10_1$ have been implanted in a direction making a non-zero angle a relative to the normal to the surface 20a, and in which pins $10_2$ are being implanted in a direction making an angle b that is different from a relative to the normal to the surface 20a. In the example shown, the angle b is equal and opposite to a. In addition to reinforcing the fiber structure in privileged directions, implanting pins in different directions can confer greater ability on the structure to withstand delamination (separation between plies), when it is formed by stacking plies.

Implanting in a plurality of different directions can be performed in a plurality of successive passes as shown in FIG. 2, or in a single pass by using a block of compressible material having pins inserted therein in a plurality of directions.

After the pins have been implanted, the consolidated fiber structure constitutes a blank for manufacturing a composite material part.

For this purpose, the blank is densified by a matrix until a desired degree of density is obtained.

For a thermostructural composite material part, densification is performed using a ceramic or carbon matrix.

Densification can be performed by chemical vapor infiltration or by a liquid method as described above for consolidation.

FIG. 3 is a diagram showing a method of implanting pins in a plurality of consolidated fiber structures that have been placed one against another in order to connect the fiber structures to one another.

In the example of FIG. 3, a fiber blank for making a part having a box beam function is made by bonding together two consolidated fiber structures 30 and 36.

The fiber structure 30 is of channel-section with flanges 32 and 34 extended by outwardly-directed rims 32a and 34a. It may be obtained by draping fiber plies on a former of corresponding shape. The plies may be constituted by two-dimensional fiber structures such as layers of woven cloth, unidirectional or multidirectional sheets, or layers of felt, for example. The shaped and superposed fiber plies may be bonded to one another by needling or other bonding techniques, for example.

In a variant, the fiber structure 30 may be obtained by shaping a multilayer woven, knitted, or braided fabric.

The fiber structure 30, possibly while being held in shape by tooling, is consolidated by chemical vapor infiltration or by a liquid technique, as described above.

The fiber structure 36 is in the form of a plate. It may be obtained by superposing flat fiber plies or by three-dimensional weaving, knitting, or braiding, or it may indeed be formed by a fixed felt layer.

The fiber structure 36 is consolidated by chemical vapor infiltration or by a liquid technique as described above.

The consolidated fiber structures 30 and 36 are placed one against the other with the structure 36 coming into contact with the rims 32a and 34a. The fiber structures 30 and 36 can advantageously be consolidated simultaneously while the fiber structures are placed one against the other.

The fiber structures are bonded together by implanting pins 40 through the combined thicknesses of the rims 32a and 34a and the adjacent portions of the structure 36.

Implanting is performed as described above. The pins 40 are initially inserted in a block 42 of compressible material such as foam or elastomer. The block 42 has a face 42a put into contact with the face 36a of the structure 36 opposite from its face 36b that is in contact with the rims 32a, 34a. A transducer 44 connected to an ultrasound generator is pressed against the face 42b of the block 42 opposite from its face 42a so as to transfer the pins 40 through the structures 30, 36 by applying ultrasound energy and compression to the block 42.

The pins can be implanted perpendicularly to the fiber structure 36 and to the rims 32a, 34a as in the example shown, or they may be implanted in a direction that forms a non-zero angle relative to the normal to the fiber structure 36.

It is also possible to implant pins in a plurality of different directions.

It should also be observed that the consolidated fiber structures 30, 36 could themselves be reinforced by having pins implanted therein before they are connected to each other.

The pins 40 may be made out of the same materials as those described above for the pins 10, in particular out of composite material obtained by densifying ceramic or carbon fiber yarn or tow with an organic matrix.

It is thus possible to make a fiber blank of complex shape. Naturally, more than two fiber structures could be connected to one another in order to obtain a blank of the desired shape.

In particular, a blank can be made for a part formed by a thin plate or web that is provided with stiffeners, the web and each of the stiffeners being consolidated separately prior to being assembled together. Channel-section fiber structures like the structure 30 of FIG. 3 can be used to make the stiffeners.

A composite material part is then obtained by densifying the fiber blank. Densification, e.g. with a ceramic or a carbon matrix, can be performed by chemical vapor infiltration or by a liquid technique, in the same manner as for consolidation.

The examples below relate to tests that have been undertaken to determine the ability of the method of the invention to reinforce and/or unite consolidated fiber structures.

EXAMPLE 1

Two fiber plates were formed, each by stacking five layers of SiC plain weave fabric made up of SiC yarn such as that sold under the name "Hi-Nicalon" by the Japanese supplier Nippon Carbon. The resulting fiber plates had a pore volume ratio equal to about 60%.

The fiber plates were consolidated by forming a PyC interphase and depositing SiC by chemical vapor infiltration, and the pore volume ratio after consolidation was reduced to about 50%.

Pins were made by stiffening a 500 filament SiC yarn supplied by the Japanese supplier Nippon Carbon, with stiffening being achieved by densifying with a BMI resin. The diameter of the pins was about 0.4 mm.

The pins were implanted through the superposed consolidated fiber plates at a density of 16 pins per square centimeter ($cm^2$). The photograph of FIG. 4 shows the surface of the resulting fiber blank. Implanting the pins did not raise any particular difficulties.

The blank fitted with the pins was densified by an SiC matrix by chemical vapor infiltration. During the temperature rise prior to densification proper, the BMI matrix of the pins was carbonized, with the pins retaining their integrity. An SiC/SiC composite material part was thus obtained in which the layers of reinforcing SiC cloth were bonded together by filamentary elements providing reinforcement in the Z direction perpendicular to the layers of woven cloth.

The resulting part was subjected to shear stress parallel to the planes of the layers of reinforcing cloth. The ability to withstand delaminating shear was measured as being equal to about 30 megapascals (MPa).

By way of comparison, a part was made from a fiber blank built up from ten layers of the same SiC cloth and densified in the same manner with an SiC matrix by chemical vapor infiltration, but without implanting any pins. Its ability to withstand delaminating shear was measured to be only about 20 Mpa.

EXAMPLE 2

A fiber structure was made in the form of a multilayer cloth obtained by three-dimensional weaving of "Hi-Nicalon" SiC fiber yarn, such as that used in Example 1. The three-dimensional fabric comprised ten layers with a pore volume ratio equal to about 65%.

The fiber structure was consolidated as in Example 1, with the pore volume ratio after consolidation being reduced to about 55%.

Pins of the same kind as in Example 1 were implanted in the consolidated fiber structure at a density of 16 pins/$cm^2$.

The resulting blank was then densified with an SiC matrix by chemical vapor infiltration.

EXAMPLE 3

The procedure was the same as in Example 2, but pins were implanted at a density of 32 pins/$cm^2$.

EXAMPLE 4

The procedure was the same as in Example 2, but the pins used were formed by SiC monofilaments of diameter equal to about 0.15 millimeters (mm) and by implanting pins at a density of 110 pins/$cm^2$.

EXAMPLE 5

For Comparison

The procedure was the same as in Example 2, but with the pin-implanting step omitted.

The table below gives the measured values for ability to withstand delaminating shear for parts $P_2$ to $P_5$ as obtained in Examples 2 to 5 and also their breaking strengths in traction in the Z direction perpendicular to the layers of reinforcing fabric as measured for parts $P_3$ and $P_5$.

|  | Part | | | |
|---|---|---|---|---|
|  | $P_2$ | $P_3$ | $P_4$ | $P_5$ |
| Delaminating shear strength (MPa) | 35 | 45 | 60 | 25 |
| Traction breaking strength (MPa) |  | 11 |  | 5 |

These results show the significant improvement provided in the strength of parts in which pins have been implanted.

EXAMPLE 6

A fiber structure was made in the form of a multilayer fabric obtained by three-dimensional weaving of carbon fiber yarn. The pore volume ratio of the fabric was about 60%.

A plate and a channel-section stiffener were formed using the resulting fabric and they were consolidated separately by being impregnated with phenolic resin, by polymerizing the resin, and then by carbonizing it. After consolidation, the pore volume ratio was reduced to about 50%.

The resulting consolidated structures were placed one against the other and bonded together by implanting pins as described with reference to FIG. 3.

The pins used were constituted by SiC monofilaments and they were implanted at a density of 110 pins/$cm^2$.

The resulting blank was densified with an SiC matrix by chemical vapor infiltration.

This example shows the advantage of the invention for making parts of complex shape very simply, e.g. parts comprising a web provided with stiffeners.

What is claimed is:

1. A method of making a fiber-reinforced composite material part, the method comprising the steps of:
   providing at least one porous fiber structure;
   consolidating the porous fiber structure by forming within it a deposit of a refractory material by partially densifying the fiber structure so as to bond together the fibers of the fiber structure by said deposit to enable the fiber structure to be handled without being deformed, the pore volume of the porous fiber structure being reduced by no more than 40% of its initial value by said partial densification so as to leave empty the major fraction of the initial pore volume of the fiber structure;
   subsequently implanting rigid pins through the consolidated porous fiber structure, whereby a reinforced consolidated fiber blank is obtained; and;
   obtaining said composite material part by further densifying said fiber blank.

2. A method of making a fiber-reinforced composite material part, the method comprising the steps of:
   providing a plurality of porous fiber structures;
   consolidating each porous fiber structure by forming within it a deposit of a refractory material by partially densifying the fiber structure so as to bond together the fibers of the fiber structure by said deposit to enable the fiber structure to be handled without being deformed, the pore volume of the porous fiber structure being reduced by no more than 40% of its initial value by said partial densification so as to leave empty the major fraction of the initial pore volume of the fiber structure;
   putting the consolidated porous fiber structures together;
   connecting the consolidated porous fiber structure together by implanting pins of rigid material through the adjoining consolidated porous fiber structures, whereby a fiber blank is obtained; and obtaining said composite material part by further densifying said fiber blank.

3. A method according to claim 1, wherein said at least one fiber structure is consolidated by reducing its pore volume by an amount lying in the range 8% to 40% of its initial value.

4. A method according to claim 1, wherein said at least one fiber structure used has a pore volume ratio lying in the range 50% to 70%, and consolidation is performed so as to reduce the pore volume ratio down to a value lying in the range 40% to 60%.

5. A method according to claim 1, wherein said at least one fiber structure is consolidated by forming a deposit of ceramic or of carbon.

6. A method according to claim 5, wherein said at least one fiber structure is consolidated by chemical vapor infiltration.

7. A method according to claim 6, wherein said at least one fiber structure is consolidated by forming a ceramic deposit by chemical vapor infiltration after forming an interphase layer on the fibers of the fiber structure, said interphase layer lying between the fibers and the ceramic deposit.

8. A method according to claim 5, wherein said at least one fiber structure is consolidated by being impregnated with a liquid composition containing a ceramic or carbon precursor, and by transforming the precursor into ceramic or carbon.

9. A method according to claim 8, wherein a composition is used containing a ceramic or carbon precursor in solution.

10. A method according to claim 1, wherein pins are used that have been made by densifying and stiffening a yarn or tow by means of a matrix.

11. A method according to claim 1, wherein pins are used that are made in the form of rigid monofilaments.

12. A method according to claim 1, wherein pins are used in the form of sticks of thermostructural composite material.

13. A method according to claim 1, wherein the pins are implanted in at least two different directions.

* * * * *

UNITED STATES PATENT AND TRADEMARK OFFICE
CERTIFICATE OF CORRECTION

PATENT NO.        : 7,200,912 B2
APPLICATION NO.   : 10/786507
DATED             : April 10, 2007
INVENTOR(S)       : Eric Bouillon et al.

It is certified that error appears in the above-identified patent and that said Letters Patent is hereby corrected as shown below:

Column 1, line 40, "Lows" should read --tows--;

Column 4, after line 40, insert the following paragraph:

--In another aspect, the invention provides a method of making a fiber-reinforced composite material part in which a blank of a shape corresponding to that of the part to be made is prepared by a method as defined above, after which the blank is densified by depositing a matrix within the pores remaining in the or each consolidated fiber structure.--

Column 10, lines 1-8, replace the table as follows:

| Part | $P_2$ | $P_3$ | $P_4$ | $P_5$ |
|---|---|---|---|---|
| Delaminating shear strength (Mpa) | 35 | 45 | 60 | 25 |
| Traction breaking strength (Mpa) |  | 11 |  | 5 |

Signed and Sealed this

Twenty Second Day of April, 2008

JON W. DUDAS
*Director of the United States Patent and Trademark Office*